Dec. 18, 1956   W. J. KEUPER   2,774,458
SEGREGATOR CONVEYOR
Filed Nov 24, 1953   3 Sheets-Sheet 1
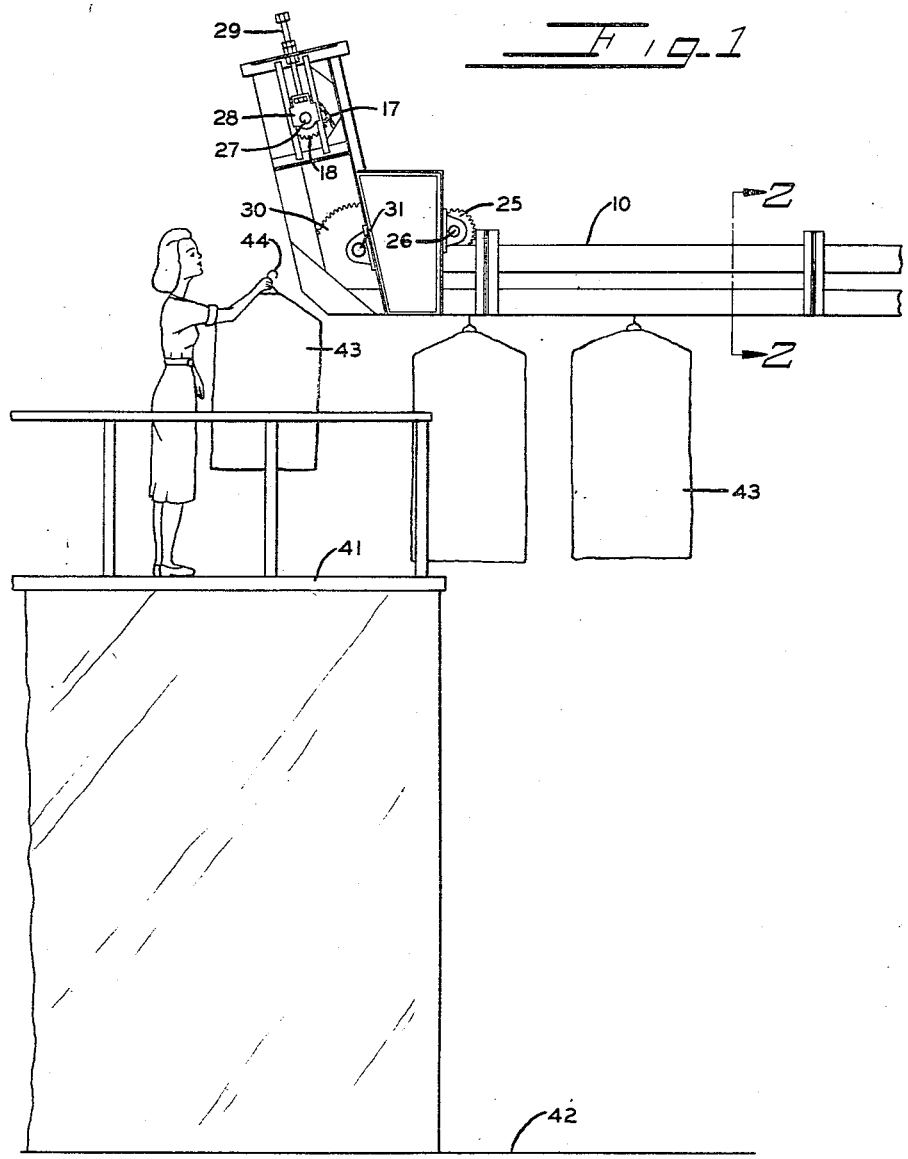
INVENTOR.
WILLIAM J. KEUPER
BY
DESJARDINS, ROBINSON & KEISER
Howard J Keiser
HIS ATTORNEYS Dec. 18, 1956 W. J. KEUPER 2,774,458
SEGREGATOR CONVEYOR
Filed Nov 24, 1953 3 Sheets-Sheet 2
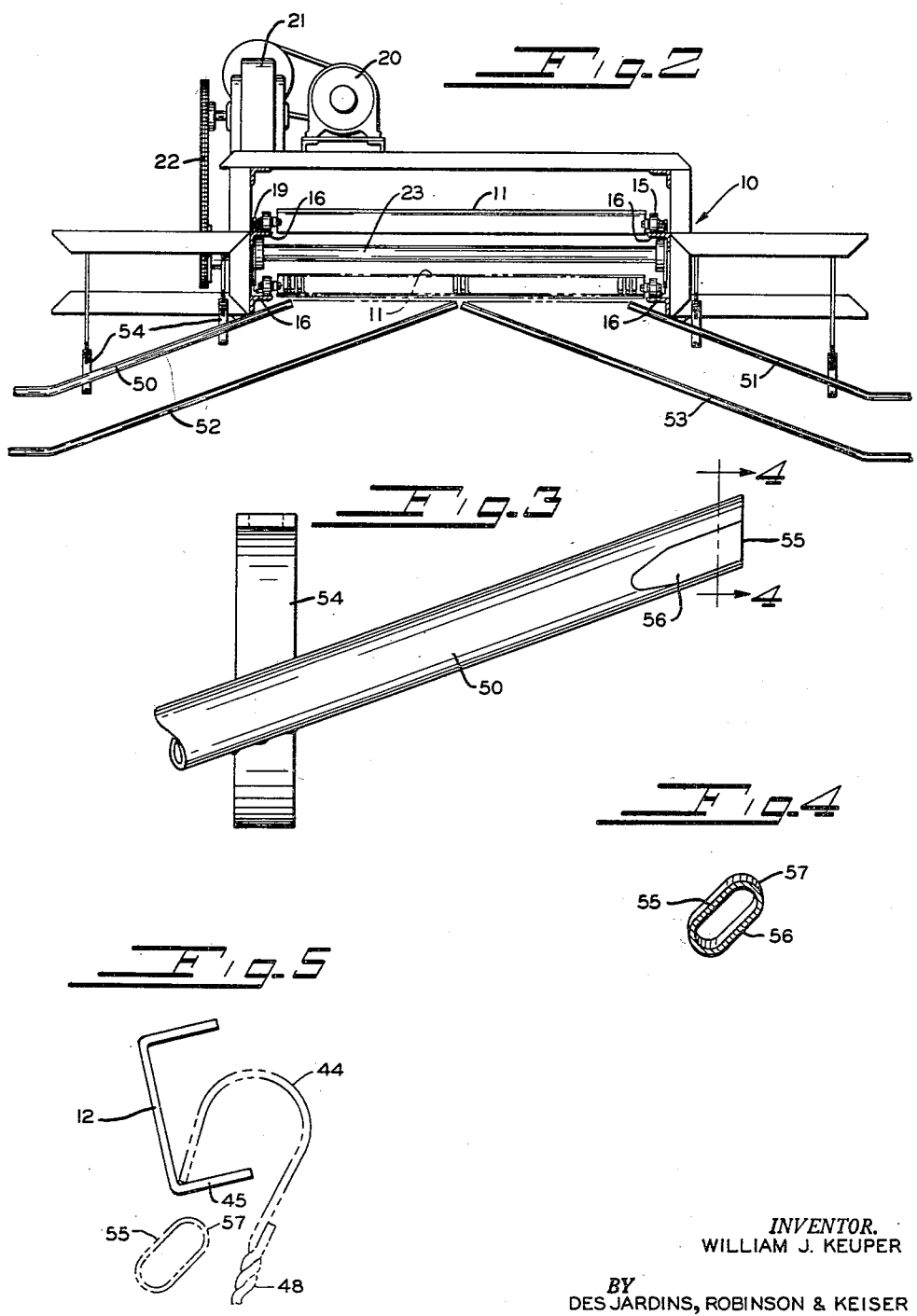
INVENTOR.
WILLIAM J. KEUPER
BY
DES JARDINS, ROBINSON & KEISER
Howard T Keiser
HIS ATTORNEYS

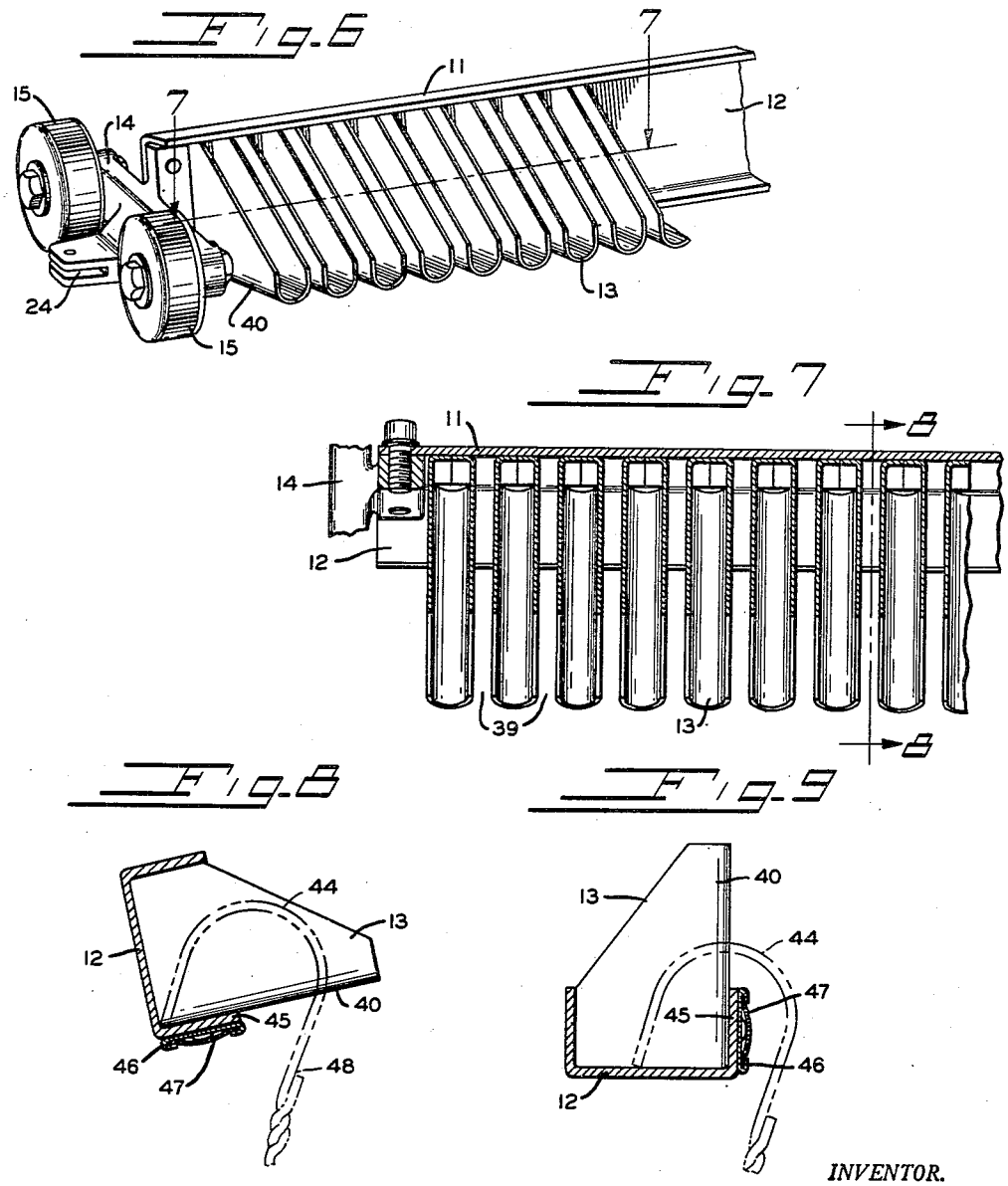

United States Patent Office

2,774,458
Patented Dec. 18, 1956

2,774,458

SEGREGATOR CONVEYOR

William J. Keuper, Cincinnati, Ohio, assignor to The National Marking Machine Company, Cincinnati, Ohio, a corporation of Ohio Application November 24, 1953, Serial No. 393,992

6 Claims. (Cl. 198—38)

This invention relates to an apparatus for facilitating the sorting of articles into a number of different categories and, more particularly, to a conveyor of improved design for distributing the articles to be sorted to a plurality of separate collecting stations in accordance with the positioning of the articles on the conveyor.

In most large cities today there will be found large dry cleaning companies having a number of small, retail stores scattered throughout the city where the garments are received from the customers, and a central cleaning plant to which the stores send the garments for dry cleaning. After the garments have been cleaned, they are sent back to the stores from which they came so that they may be picked up by customers and paid for. In the larger of these establishments where the garments are received from fifty to one-hundred retail stores, the segregation of the garments at the dry cleaning plant for return to the retail stores presents a sizeable task since the garments must be classified according to stores. To facilitate this sorting and classification of the garments preparatory to their return to the stores, it has been proposed to make use of a distributing type conveyor so as to enable the garments to be distributed to a large number of collecting stations by an operator stationed at a fixed location. According to this system, the garments are merely hung in the correct locations on the carriers of the conveyor as they move past the operator whereupon the garments are transported from the loading point to the distributing section of the conveyor. Here they are automatically picked off the conveyor and delivered to the various collecting stations, each station corresponding to one of the retail stores serviced by the cleaning plant. The conveyor forming the subject matter of this application has been designed with a view to perfecting it for the particular problem at hand and to provide a specific conveying apparatus which fully meets the needs of the dry cleaning industry.

Accordingly, it is an object of my invention to provide an improved type of conveying apparatus for facilitating the segregating of articles of various sorts into a plurality of separate categories.

Another object of my invention is to provide a segregator conveyor of improved design for transporting the articles to be classified from a loading station to a distributing section where the different categories of articles are routed onto classifying rails where they are collected and readied for further distribution.

Another object of the invention is to provide an improved form of carrier for a segregator type conveyor.

Another object of the invention is to provide an improved form of collecting rail for removing the hangers, on which the articles are hung, from the conveyor.

Another object of the invention is to provide an improved segregator conveyor having a loading platform so located with respect to the loading zone of the conveyor as to greatly facilitate the work of the operator in classifying the articles onto the conveyor.

With these and other objects in view which will become apparent from the following description, the invention includes certain novel features of construction and combinations of parts, the essential elements of which are set forth in the appended claims and a preferred form or embodiment of which will hereinafter be described with reference to the drawings which accompany and form a part of this specification.

In the drawings:

Fig. 1 is a side elevation showing the loading end of the segregator conveyor and the relation of the loading platform and the girl operator thereon with respect to the loading zone of the conveyor.

Fig. 2 is a vertical cross section taken through the conveyor along the line 2—2 in Fig. 1 and looking toward the distributing section of the conveyor.

Fig. 3 is a fragmentary view showing certain of the constructional details of the collecting rails.

Fig. 4 is a cross-sectional view taken along the line 4—4 in Fig. 3.

Fig. 5 is a detail view illustrating the manner in which the garment hanger is picked off the carrier by the end of the collecting rail.

Fig. 6 is a perspective view of a portion of one of the transverse carriers on which the garments are transported from the loading station to the distributing section.

Fig. 7 is a cross-sectional view taken along the line 7—7 in Fig. 6.

Fig. 8 is a cross-sectional view taken along the line 8—8 in Fig. 7.

Fig. 9 is a view similar to Fig. 8 but showing the parts in the positions which they assume when the carrier is at the loading zone.

As heretofore mentioned, the distributing type conveyor hereinafter to be described in connection with the accompanying drawings has been especially designed for use by large dry cleaning establishments which are confronted with the problem of classifying the cleaned garments into a large number of different categories. It will readily be appreciated, however, that my improved form of conveying apparatus might advantageously be used with little or no change by large post offices where bags of mail must be sorted and assembled according to zone, by factories where various types of materials or articles must be sorted and distributed to different collecting stations, and so forth.

In the illustrated embodiment of the invention, the dry cleaned garments are hung on coat hangers and covered with paper garment bags preparatory to their transportation from the dry cleaning plant to the retail store. The bagged garments are segregated according to retail store by my improved form of conveying apparatus which, as shown in Figs. 1 and 2, includes a frame, indicated generally at 10, which is made up principally of iron shapes and plates welded together to form a rigid, unitary structure which is preferably suspended from the roof trusses of the building within which the conveyor is housed. The conveyor, for the sake of description, may be arbitrarily divided into two portions or sections in accordance with the functions which they perform. Thus, the forward end of the conveyor, which is shown in Fig. 1, may aptly be termed the loading section of the conveyor since the garments to be distributed are placed on the conveyor at this point as indicated in Fig. 1. The rear portion of the conveyor, shown in Fig. 2, may be termed the distributing section by virtue of the take-off bars or rails which are spaced at intervals along the length of the conveyor. The garments are transported by carriers 11 which, as best shown in Fig. 6, are constructed of channels 12 to which a plurality of dividers 13 are affixed. Secured to the opposite ends of each channel 12 are castings 14 on which a pair of wheels or rolls 15 are journaled. The wheels 15 are adapted to run on a track formed by rails 16 (Fig. 2) which are part of the framework 10 of the conveyor. The ends of the carriers are attached to a pair of spaced driving chains 17 (Fig. 1) which pass about a pair of upper sprockets 18 at the forward end of the conveyor and a pair of driving sprockets 19 at the rear end of the conveyor as shown in Fig. 2. The pair of chains are driven in unison by a prime mover 20 which drives the shaft 23 on which the drive sprockets 19 are mounted by means of a variable speed drive mechanism 21 and a chain drive 22. Each of the castings 14 is provided with a fastening lug 24 (Fig. 6) by means of which the carriers may be suitably attached to the drive chains 17.

The drive chains follow generally horizontal upper and lower flights from the front of the conveyor to the rear thereof. The chains on the lower flight travel from front to rear and carry the garments from the loading zone to the distributing section. The upper flights of the chains serve to return the carriers from the rear of the conveyor to the forward end thereof. As the chains, and the carriers attached thereto, approach the forward end of the conveyor, they are taken around sprockets 25 secured on opposite ends of a shaft 26 journaled in the framework of the conveyor. After leaving the sprockets 25 the chains then proceed upwardly and pass around the upper sprockets 18 which are secured to opposite ends of a shaft 27. This shaft is journaled in bearing blocks 28 which may be moved up or down by adjusting screws 29 to control the tension of the drive chains. After passing about the upper sprockets 18, the chains and carriers move downwardly and pass about forward sprockets 30 which are secured on opposite ends of a shaft 31 journaled in bearings mounted in the conveyor frame. The carriers and drive chains then travel rearwardly with the wheels 15 of the carriers rolling along the rails 16 (Fig. 2) until they reach the rear end of the conveyor. Here the chains pass about the drive sprockets 19 and the carriers commence the return trip from the rear end of the conveyor to the forward end thereof in an upside down position with the wheels 15 again rolling along the rails 16. At the forward end of the conveyor, as previously described, the chains pass about the sprockets 25 and travel upwardly to the upper sprockets 18 and thence downwardly about the forward sprockets 30.

The carriers 11 are designed to include as many dividers 13, plus one, as there are categories of garments to be handled by the system. That is, if the conveyor is to be capable of distributing the garments hung thereon into any one of fifty different categories, the carriers 11 should be provided with fifty-one dividers 13 so as to provide fifty spaces 39 between dividers into which the hooks of the coat hangers may be inserted. As shown herein, the dividers 13 are formed of sheet metal bent into the shape of the letter U and welded to the channel 12. As the carriers travel downwardly from the upper sprockets 18 to the forward sprockets 30 the closed, rounded edges 40 of the dividers 13 lie in a substantially vertical plane as indicated in Fig. 9. Hence, the curved surfaces 40 are presented to the operator who, as shown in Fig. 1, stands on a raised platform 41 the elevation of which above the ground level 42 is such as to cause the forward sprockets 30 to lie at approximately shoulder height. The garments to be classified are supplied to the operator on the platform so that she may conveniently hang the garments on the carriers as they move down about the forward sprockets 30. The platform 41 thereby serves to place the operator within easy reach of the loading zone, which is the position of the carriers as they approach the forward sprockets 30.

In Fig. 1, the operator is shown in the act of placing a bagged garment 43 on one of the carriers as it approaches the sprockets 30. The garment is supported on a coat hanger of conventional design which is provided with the customary hook 44. As best shown in Fig. 9, the hook 44 is inserted in one of the spaces 39 between adjacent dividers 13 with the hook engaging over the forward lip 45 of the channel 12. As the carrier passes about the forward sprockets 30 it will turn through an angle of somewhat less than 90° and assume the position shown in Fig. 8 as it travels along the horizontal portion of the conveyor. In this position of the carrier, the web of the channel 12 is inclined somewhat with respect to the vertical so that the lip 45 will slope inwardly and serve to retain the end of the hook on the carrier.

The forward face of the lip 45 is preferably provided with a longitudinally extending strip 46 having inwardly curved edges for retaining an indicia strip 47 containing markings identifying the spaces 39 between the dividers in accordance with the different categories into which the garments are to be classified. The markings on the strip 47 enable the operator to place the hooks of the coat hangers into the appropriate slots 39 to cause the garments to be classified into the proper categories. It will be observed that with carriers of the construction disclosed in Figs. 6 to 9, inclusive, it will be impossible for an operator to improperly engage the hooks 44 with the carriers so as to cause improper contact between the neck portion 48 of the coat hanger and the end of the collecting rail in the distributing section of the conveyor. That is, the dividers 13 are of sufficient height to prevent the operator's placing the hook over the top of a divider instead of over the lip 45 in the space between adjacent dividers. Also, it will be observed that the curved forward edges 40 of the dividers facilitate entry of the hooks 44 into the appropriate slots 39 and speeds up the work of the operator at the loading station.

In the distributing section of the conveyor, means is provided for automatically removing the garments from the conveyor and collecting them in groups corresponding to the various categories into which they are classified. As shown in Fig. 2, a plurality of collecting bars or rails, such as the rails 50, 51, 52 and 53, are suspended from the framework of the conveyor by hangers 54. The rails are preferably of circular cross-section and each rail is disposed with its inner end terminating immediately below the bottom edge of a carrier 11, the rail sloping downwardly from this point so as to enable the garments to slide down the rail until they reach a horizontal portion thereof where they will collect on the rail ready for removal therefrom. As best shown in Fig. 3, the hangers 54 are generally C-shaped and have their lower ends fastened to the undersides of the rails 50 so as not to interfere with the travel of the coat hangers down the rails. The number of rails is, of course, equal in number to the spaces between dividers 13 and the inner end of each rail terminates adjacent one of the spaces between dividers. The outermost rails 50 and 51 are located at the forward end of the distributing section while the innermost rails 52 and 53 are located at the rear end of the section with the intermediate rails occupying corresponding intermediate positions in the direction of the length of the conveyor.

To facilitate removal of the hangers from the lip 45 of the carriers without any possibility of misoperation, the end portions 55 of the rails are flattened as indicated at 56 in Fig. 3. This gives the end portion of each of the rails a shape as shown in Fig. 4 with the major axis of the section inclined with respect to the vertical as indicated. As shown in Fig. 5, this inclination is in such a direction as to cause the upper edge of the end portion 55 to make first contact with the neck portion 48 of an oncoming clothes hanger so as to insure that the hook will engage over the end of the rail even though it be deformed and out of shape. This condition is indicated in Fig. 5 where the hook 44 is shown as having an abnormal shape in which the hook is more nearly closed than normal. It will be seen that even as thus bent, the end of the hook will be certain to engage over the rail when it is pushed off the lip 45.

The operation of my improved segregator conveyor is as follows: The finished garments which are ready for distribution to the various retail stores are delivered to the platform 41 and placed thereon so as to be within easy reach of the operator. As each carrier 11 moves downwardly in front of the operator, she hangs one of the bagged garments 43 on the carrier. The bagged garments are marked with identifying indicia which is noted by the operator who then inserts the hook 44 in the corresponding slot 39 identified by the indicia printed on the strip 47 (Fig. 9). As the carriers move through the distributing section of the conveyor, they move past the ends 55 (Fig. 3) of the collecting rails and the garments hung thereon will be picked off the conveyor by a particular one of the rails depending upon the notch 39 into which the garment has been classified. When the necks of the coat hangers strike against the ends of the collecting rails, the hooks 44 will be pushed off the lip 45 of the carrier and the hook will drop down over the end of the rail whereupon the garment will slide down the inclined portion of the rail and will finally come to rest on a horizontal portion of the rail. In this way, all of the garments which are intended for delivery to a particular retail store will be accumulated on the lower end of one of the collecting rails ready to be placed on a truck and delivered to that particular store. The same is true of all the remaining collecting rails, there being one such rail for each retail store which is to be serviced by the dry cleaning plant.

After the garments have been removed from the carriers 11, the carriers move on down to the end of the conveyor where they pass around the drive sprockets 19 and return to the front of the conveyor along the upper flight of the conveyor. The variable speed drive mechanism 21 (Fig. 2) is of a type which may be manually adjusted to provide varying speeds of the drive sprockets 19. In this way, the speed of the conveyor may be adjusted to suit the requirements of the particular operator who is classifying garments onto the conveyor. Thus, in the case of an experienced operator the conveyor may be speeded up to permit faster movement of the garments from the loading zone to the collecting rails, while for a slower or less experienced operator, the conveyor may be slowed down to a point where she is able to classify a garment onto each carrier as it passes the loading zone.

While I have described my invention in connection with one possible form or embodiment thereof and have used, therefore, certain specific terms and language herein, it is to be understood that the present disclosure is illustrative rather than restrictive and that changes and modifications may be resorted to without departing from the spirit or the scope of the claims which follow.

Having thus described my invention, what I claim as new and useful and desire to secure by United States Letters Patent, is:

1. In an apparatus for classifying garments on coat hangers into a plurality of different categories wherein there is provided a conveyor for transporting the garments from a loading zone to a distributing zone, and a plurality of rails at the distributing zone for receiving the garments from the conveyor, each rail being adapted to receive garments belonging to a particular category, the combination of a transverse carrier on said conveyor, means on said carrier for receiving the hooks of the coat hangers and supporting the garments in their travel from the loading zone to the distributing zone, and a plurality of dividers spaced at equal intervals along said carrier to divide said receiving means into as many slots as there are rails, said dividers being in the general form of flat, upstanding blocks, the side faces of which are parallel to the side faces of adjacent dividers to form transversely extending slots spaced along the carrier for receiving the hooks of the coat hangers.

2. The apparatus of claim 1 wherein said receiving means comprises a lip extending lengthwise of said carrier adjacent one edge of said dividers.

3. The apparatus of claim 2 wherein the edges of the dividers lying adjacent said lip are rounded to facilitate the entry of the hooks of the coat hangers into the spaces between dividers.

4. In an apparatus for classifying garments on coat hangers into a plurality of different categories wherein there is provided a conveyor for transporting the garments from a loading zone to a distributing zone, and transverse carriers on said conveyor provided with means for receiving the hooks of the coat hangers and supporting the garments in their travel from the loading zone to the distributing zone, the combination of a plurality of rails at the distributing zone each adapted to receive from the carriers the garments belonging to a particular category, said rails having their ends disposed in a staggered relationship beneath the path of travel of said carriers and the ends of said rails having flat side faces inclined at a substantial angle with respect to the vertical, the upper edges of the rails being located ahead of the lower edges thereof so that the upper edge will be the first to contact the neck of an oncoming coat hanger.

5. In an apparatus for classifying garments on coat hangers into a plurality of different categories wherein there is provided a conveyor for transporting the garments from a loading zone to a distributing zone, and a plurality of rails at the distributing zone each adapted to receive from the conveyor the garments belonging to a particular category, the combination of a conveyor frame, a pair of spaced, endless conveyor chains supported for movement about said frame, said conveyor chains moving downwardly along a substantially vertical flight to the loading zone and then along a substantially horizontal flight from the loading zone to the distributing zone, a plurality of transverse carriers disposed at intervals between said chains, a plurality of transversely disposed dividers spaced at equal intervals along each of said carriers to divide the carrier into as many slots as there are rails, said dividers being mounted on their respective carriers so as to stand upright thereon as the carrier traverses the vertical flight of said conveyor chains, and a platform at the loading zone for accommodating the operator and the garments to be segregated, said platform being of such a height as to place the operator at approximately shoulder level with respect to the loading zone thereby facilitating the hanging of the garments on the carriers as they move vertically through the loading zone.

6. In an apparatus for classifying garments on coat hangers into a plurality of different categories wherein there is provided a conveyor for transporting the garments from a loading zone to a distributing zone, and a plurality of rails at the distributing zone each adapted to receive from the conveyor the garments belonging to a particular category, the combination of a conveyor frame, a pair of spaced, endless conveyor chains supported for movement about said frame, said conveyor chains moving downwardly along a substantially vertical flight to the loading zone and then along a substantially horizontal flight from the loading zone to the distributing zone, a plurality of transverse carriers disposed at intervals between said chains, and a plurality of transversely disposed dividers spaced at equal intervals along each of said carriers to divide the carrier into as many slots as there are rails, said dividers being mounted on their respective carriers so as to stand upright thereon as the carrier traverses the vertical flight of said conveyor chains.

References Cited in the file of this patent

UNITED STATES PATENTS

| Number | Name | Date |
| --- | --- | --- |
| 386,314 | Green | July 17, 1888 |
| 1,664,393 | Bixler | Apr. 3, 1928 |
| 1,775,545 | Anderson | Sept. 9, 1930 |
| 1,781,655 | Cowley | Nov. 11, 1930 |
| 2,155,583 | Bonnar | Apr. 25, 1939 |